(12) United States Patent
Robertson et al.

(10) Patent No.: US 10,926,736 B2
(45) Date of Patent: Feb. 23, 2021

(54) POSITIONAL-DEPENDENT DEPLOYMENT OF VEHICLE AIRBAGS

(71) Applicant: TOYOTA MOTOR ENGINEERING & MANUFACTURING NORTH AMERICA, INC., Plano, TX (US)

(72) Inventors: Winston Robertson, Ann Arbor, MI (US); William Patrick Garrett, Plymouth, MI (US); George Evans, Ann Arbor, MI (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 45 days.

(21) Appl. No.: 16/404,459

(22) Filed: May 6, 2019

(65) Prior Publication Data
US 2020/0353886 A1 Nov. 12, 2020

(51) Int. Cl.
*B60R 21/2338* (2011.01)
*B60R 21/00* (2006.01)
*B60R 21/01* (2006.01)
*B60R 21/16* (2006.01)

(52) U.S. Cl.
CPC .. *B60R 21/2338* (2013.01); *B60R 2021/0032* (2013.01); *B60R 2021/0048* (2013.01); *B60R 2021/01238* (2013.01); *B60R 2021/161* (2013.01); *B60R 2021/23384* (2013.01); *B60R 2021/23388* (2013.01); *B60W 2420/403* (2013.01)

(58) Field of Classification Search
None
See application file for complete search history.

(56) References Cited

U.S. PATENT DOCUMENTS

| | | | |
|---|---|---|---|
| 6,189,928 B1 * | 2/2001 | Sommer | B60R 21/233 280/731 |
| 7,526,120 B2 | 4/2009 | Gokturk | |
| 7,983,817 B2 | 7/2011 | Breed | |
| 7,988,190 B2 | 8/2011 | Breed | |
| 2002/0175511 A1 * | 11/2002 | Dunkle | B60R 21/2338 280/743.2 |
| 2004/0090053 A1 * | 5/2004 | White | B60R 21/01528 280/735 |
| 2006/0290117 A1 * | 12/2006 | Fischer | B60R 21/01542 280/739 |
| 2009/0121460 A1 * | 5/2009 | Abe | B60R 21/239 280/728.3 |
| 2009/0302588 A1 * | 12/2009 | Schramm | B60R 21/233 280/743.2 |
| 2010/0109306 A1 * | 5/2010 | Dong | B60R 21/2338 280/743.2 |

(Continued)

*Primary Examiner* — Drew J Brown
(74) *Attorney, Agent, or Firm* — Sheppard, Mullin, Richter & Hampton LLP; Hector A. Agdeppa; Daniel N. Yannuzzi

(57) ABSTRACT

A positional-dependent airbag deployment system is provided. A plurality of tether cutters are configured to cut at least one of a plurality of tethers affixed to an airbag. An image sensor is configured to monitor the position of an occupant's head within a vehicle. In response to detecting a collision event, an airbag controller determines a trajectory of the occupant's head based on the image sensor data and other data and determines a cutting sequence of the tethers such the airbag will be deployed in a trajectory to intercept the occupant's head.

20 Claims, 10 Drawing Sheets

(56) References Cited

U.S. PATENT DOCUMENTS

| | | | |
|---|---|---|---|
| 2014/0217712 A1* | 8/2014 | Nakamura | B60R 21/2338 |
| | | | 280/739 |
| 2017/0096118 A1* | 4/2017 | Kruse | B60R 21/203 |
| 2017/0217399 A1* | 8/2017 | Patel | B60R 21/01552 |
| 2018/0111581 A1* | 4/2018 | Wang | B60R 21/2338 |
| 2018/0201222 A1 | 7/2018 | Gandhi | |
| 2018/0281741 A1* | 10/2018 | Nagasawa | B60R 21/2338 |
| 2019/0118759 A1* | 4/2019 | Kobayashi | B60R 21/23138 |
| 2019/0329728 A1* | 10/2019 | Malapati | B60R 21/239 |
| 2019/0351862 A1* | 11/2019 | Aranzulla | B60R 21/231 |
| 2020/0017061 A1* | 1/2020 | Rutgersson | B60R 21/237 |
| 2020/0031304 A1* | 1/2020 | Malapati | B60R 21/2035 |

* cited by examiner

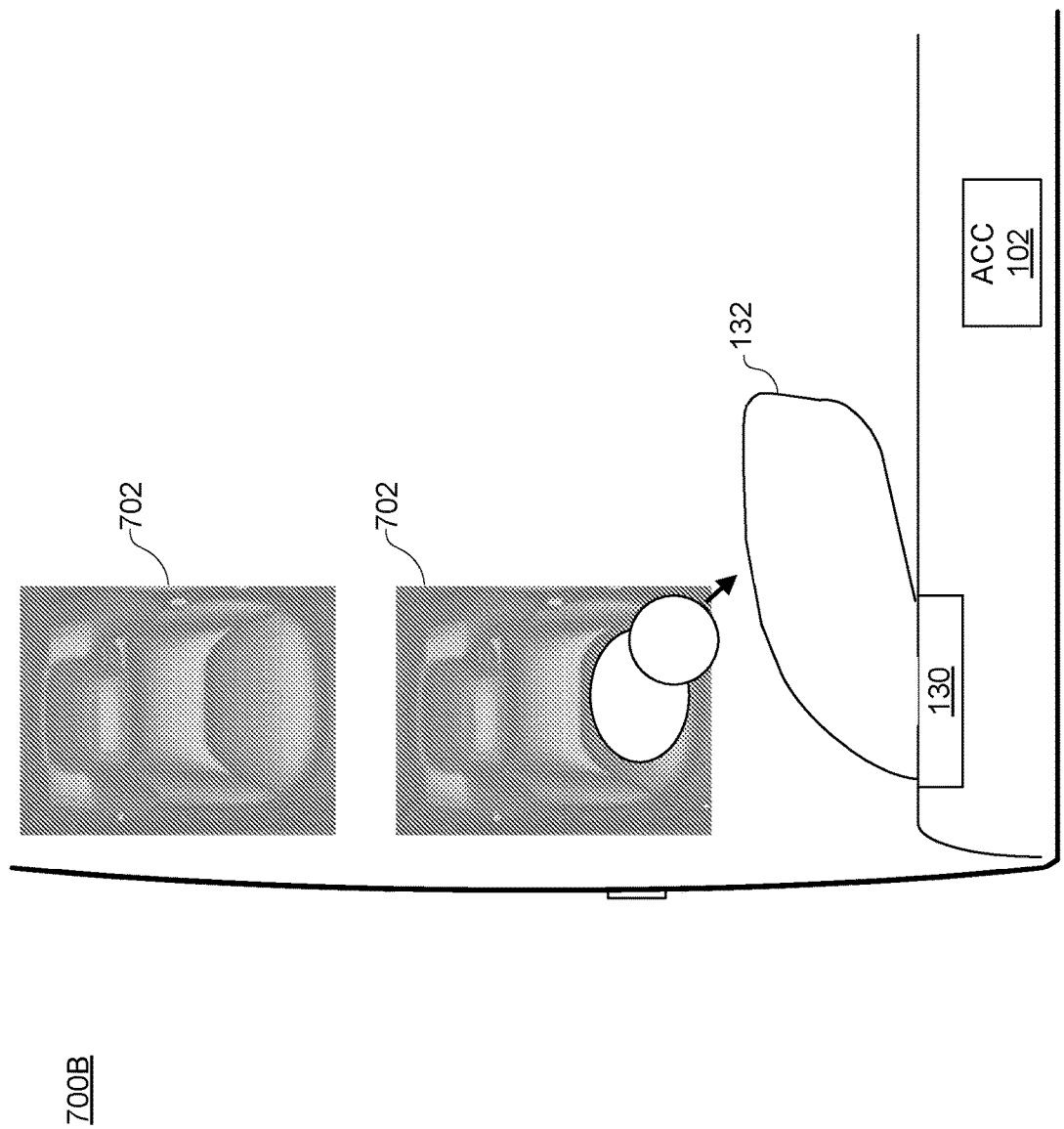

US 10,926,736 B2

POSITIONAL-DEPENDENT DEPLOYMENT OF VEHICLE AIRBAGS

TECHNICAL FIELD

The present disclosure relates generally to automobile safety systems, and in particular, some implementations may relate to optimal deployment of airbags based on a detected position of an occupant's head.

DESCRIPTION OF RELATED ART

An airbag is a vehicle occupant restraint system intended to protect an occupant during a collision. When a collision is detected, a bag is inflated rapidly to stop the momentum of the occupant and prevent the occupant from impacting objects that may cause harm (e.g., front dashboard, door, door window, etc.). To meet minimum safety requirements, airbags are generally designed to fill a large area between the occupant and the interior surface of the vehicle.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 7B illustrates another example vehicle interior in accordance with embodiments of the technology disclosed herein.

Figure 1:
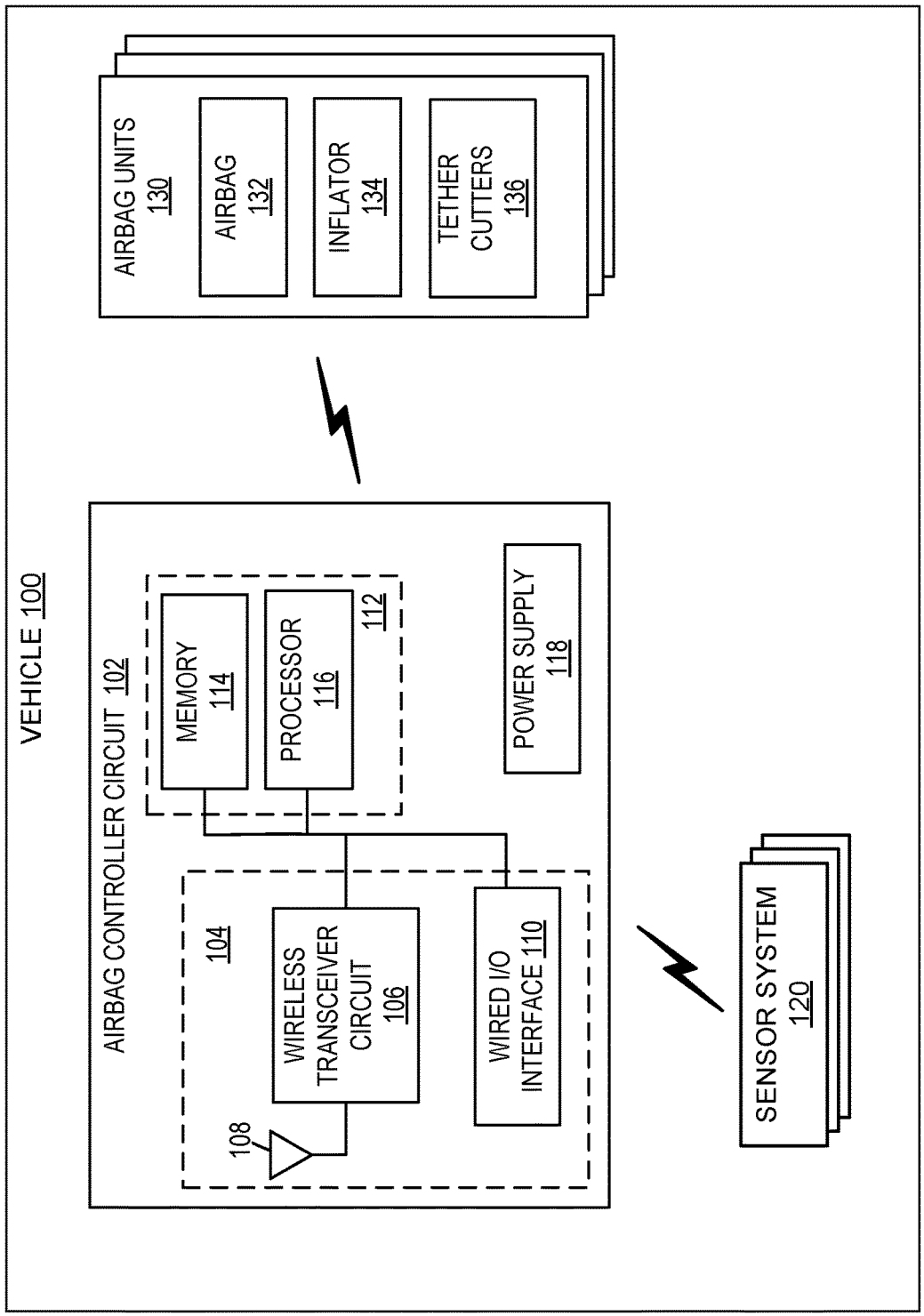
FIG. 1 illustrates an example vehicle interior in accordance with embodiments of the technology disclosed herein.

The figures are not exhaustive and do not limit the present disclosure to the precise form disclosed.

DETAILED DESCRIPTION

Airbag design tends to focus on the position of the airbag at deployment (e.g., how wide is the airbag, the normal amount of extension, etc.). The direction or trajectory of deployment is static, with the construction of the airbag and tethers are used to control the distance and stiffness of the airbag. However, if the occupant is not seated as tested the direction or trajectory of the airbag may not be optimal to protect the occupant's head. For example, in an automobile, an occupant who is leaning across towards the driver side from the passenger seat. During a collision event, the airbag may deploy but the occupant's head may impact on the edge of the airbag. This may cause the occupant's head roll off the side, causing an unintended strain or twist of the neck of the occupant. When the occupant is also restrained by a seatbelt, this may result in serious spinal injuries. Ideally, an occupant's head should impact as close to the center of the airbag as possible, not only in the automotive context, but in other contexts as well. Non-limiting examples include airplanes, trains, boats, ships, military vehicles (e.g., submarines, tanks, personnel carriers, etc.), elevators, construction equipment, trollies, lifts (e.g., ski lifts), among other vehicles.

Embodiments of the technology of the present disclosure enable control over the trajectory of deployment of an airbag. The position and movement of an occupant's head is determined at the time of a collision event. Based on the determined position, a deployment sequence is determined. In various embodiments, the deployment sequence may comprise a tether-cutting sequence to control the direction(s) in which an airbag is deployed. The direction(s) in which an airbag is deployed can be optimized based on the position of an occupant's head relative to the airbag. In this way, the technology disclosed herein achieves the risk-reducing benefits of current airbags while further reducing the risk of unintended head injuries. Moreover, embodiments of the present disclosure reduces the airbag volume required to cover the same area.

By determining deployment with respect to the position of the occupant's head, embodiments of the present disclosure enables greater flexibility in protecting occupants not positioned in a traditional orientation to the airbag. For example, rather than an occupant being positioned to face the location of the airbag (for frontal airbag systems), the occupant could face perpendicular to the airbag (e.g., seated to face towards the opposite side of the vehicle or out the side of the vehicle) and the airbag may be deployed in a manner to account for the changed orientation. This enables greater flexibility in interior design of vehicles, including autonomous vehicles which do not require occupants to control the vehicle.

Airbag systems are widely used in vehicles to reduce the risk of injury or death of an occupant during a collision. Various types of airbags may be installed throughout the vehicle cabin, including in the steering wheel, the dash board, inside panels on the doors, or along the roof (e.g., curtain airbags), among other places. In operation, airbag systems provide a cushion between an occupant and the vehicle's interior, reducing the risk for the occupant or any of the occupant's extremities from hitting the interior (e.g., dashboard, window, etc.) during a collision. When a sudden deceleration or other change in momentum is detected by the vehicle's electronic control unit (ECU), the airbag systems are deployed to fill a space between the occupant and the vehicle interior. With the increased development of autonomous vehicles, the potential locations and orientations of airbags within vehicles (e.g., automotive, aeronautical, etc.) may extend beyond the traditional locations to account for new seating orientations within a vehicle cabin. As a non-limiting example, airbags could be placed in the center of a vehicle cabin (on the ceiling, the floor, or both), configured to protect individuals with seats facing the interior of the vehicle. Although discussed with respect to traditional airbag configurations, a person of ordinary skill in the art would know that the technology disclosed herein is applicable to any airbag system, known or to be developed.

Nothing in this disclosure should be interpreted as limiting the scope of the technology of the present disclosure to only current automotive airbags.

The position, size, and deployment rate of airbags are generally governed by safety regulations and are designed to account for a limited number of as expected crash modes. To ensure compliance, most airbags are designed to cover a wide area between an occupant and the interior of the vehicle. Because of the imprecision, the size of traditionally-operated airbags will need to increase to account for the impact of autonomous vehicles on the configuration of vehicle interiors. By implementing embodiments in accordance with the present disclosure, the total volume of airbags may be reduced to cover the same area, providing protection for worst-case occupant head positions in a more efficient and economical manner.

Tethers and other restraining devices are generally used to control the shape and size of the airbag. Some tethers are used to control the pressure and stiffness of the airbag. Moreover, airbag deployment can be dangerous, especially if the occupant contacts the airbag before it is fully deployed or the airbag is too stiff. In some instances, tethers are included within the airbag to restrain an uninflated portion of the airbag during deployment. The tethers restrict the uninflated portion from extending beyond its normal distance before the airbag reaches its fully inflated shape. In this way, the possibility of airbag "slapping" (i.e., where the airbag hits the occupant) can be limited, reducing the risk of injury. In some cases, the tethers may be tuned such that they will snap once a particular pressure is reached in the airbag (i.e., a pressure whereby the slapping motion will not occur).

Tethers may also be designed to manage the amount of air vents that open in the airbag, thereby controlling the stiffness and interior pressure of the airbag. The tethers may include or are attached to one or more flaps associated with an air vent in the air bag. When the tether is tensed (i.e., the airbag is deployed), the flap(s) seal the air vent, limiting the number of openings available for air to exit the airbag upon contact with the occupant. For smaller occupants (e.g., children relative to adults), lower pressure within the bag is desirable to reduce the possibility of such smaller occupants bouncing off the airbag. When a smaller occupant is detected by the vehicle's ECU, the tether may be cut, thereby relieving the tension holding the flap(s) in place over the vent and allowing more air to be pushed out when the smaller occupant contacts the bag.

Tethers may also be used to control the final shape of the airbag. Airbag shapes are generally determined based on the configuration of the fabric walls that comprise the airbag. Tethers may also be used to set the shape of the fully inflated airbag to account for situations where the expansion of an airbag may need to be restricted. For example, if an occupant is positioned close to a location where an airbag is stored (in its undeployed state), the airbag may not fully inflate before it contacts the occupant. This can cause serious injury to the occupant. Tethers within the airbag may be configured to restrict the center of the airbag from expanding fully (e.g., out to a maximum possible distance from its storage location). The tethers may be affixed at points inside the airbag and designed to extend a shorter distance than the maximum distant to which the airbag extends when fully deployed. This allows the airbag to inflate prior to the occupant hitting the airbag by restricting the center from expanding fully, while the rest of the airbag is unhindered. This also results in a change in the airbag shapes. If the vehicle's ECU detects that the occupant is positioned sufficiently far enough away from the airbag system, the tethers restraining the airbag expansion may be cut, allowing the airbag to extend to its maximum distance at normal deployment.

It should be noted that the terms "optimize," "optimal" and the like as used herein can be used to mean making or achieving performance as effective or perfect as possible. Moreover, techniques disclosed herein can refer to, e.g., performing calculations, etc. that result in "more accurate" determinations. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

FIG. 1 illustrates an example architecture of a vehicle 100 incorporating a positional-dependent airbag deployment system in accordance with embodiments of the technology disclosed herein. Vehicle 100 may be a car, truck, van, or any other type of vehicle, and may be human-controlled, semi-autonomous, or fully autonomous. The vehicle 100 may include a variety of different systems, subsystems, and components in operative communication with each other. In various embodiments, vehicle 100 can include an airbag controller circuit 102, a sensor system 120, and a plurality of airbag units 130. Other systems, subsystems, and components may also be included in vehicle 100 as needed for operating the vehicle 100. In various embodiments, airbag controller circuit 102 may also represent or be embodied in a plurality of controllers or computing devices that may process information and/or serve to control individual components or systems of the vehicle 100 in a distributed fashion. In various embodiments, airbag controller circuit 102 can be implemented as a separate airbag electronic control unit (ECU) or as part of the main ECU of the vehicle 100. In some embodiments, airbag controller circuit 102 may be implemented independently of the main ECU of the vehicle 100.

Airbag controller circuit 102 is configured to control operation of the various airbag units 130 of the vehicle 100 responsive to information received from the sensor system 120. Airbag controller circuit 102 in this example includes a communication circuit 104, a deployment sequencing circuit 112 (including a processor 116 and a memory 114), and a power supply 118. Components of the airbag controller circuit 102 are illustrated as communicating with each other via a data bus, although other communication interfaces may be included.

Processor 116 can include a GPU, CPU, microprocessor, or any other suitable processing system. The memory 114 may include one or more various forms of non-transitory memory or data storage (e.g., flash, RAM, etc.) that may be used to store machine-readable instructions, parameters, and variables for the processor 116 as well as any other suitable information. Memory 114 can be made up of one or more modules of one or more different types of memory, and may be configured to store data and other information as well as operational instructions that may be used by the processor 116.

Although the example of FIG. 1 is illustrated using processor and memory circuitry, as described below with reference to circuits disclosed herein, deployment sequencing circuit 112 can be implemented utilizing any form of circuitry, including for example hardware, software, or a combination thereof. By way of further example, one or more processors, controllers, ASICs, PLAs, CPLDs, logical components, software routines, or other mechanisms might be implemented to make up the airbag controller circuit 102.

Communication circuit 104 can include either or both of a wireless transceiver circuit 106 with an associated antenna 108 and a wired input/output (I/O) interface 110 with an associated hardwired data port (not shown). As this example illustrates, communications with the airbag controller circuit 102 can include either or both wired and wireless communications circuits, 110 and 106 respectively. Wireless transceiver circuit 106 can include a transmitter and a receiver (not shown) to allow wireless communications via any of a number of communication protocols. Non-limiting examples of such protocols include WiFi, Bluetooth, near field communications (NFC), ZigBee, and any of a number of other wireless communication protocols whether standardized, proprietary, open, point-to-point, networked or otherwise. Antenna 108 is coupled to wireless transceiver circuit 106 and is used by wireless transceiver circuit 106 to transmit radio signals. These RF signals can include information of almost any sort that is sent or received by airbag controller circuit 102 to/from other entities such as sensor system 120 and airbag units 130.

Wired I/O interface 110 can include a transmitter and a receiver (not shown) for hardwired communications with other devices. For example, wired I/O interface 110 can provide a hardwired interface to other components, including sensor system 120 and airbag units 130. Wired I/O interface 110 can communicate with devices using Ethernet or any of a number of other wired communication protocols, whether standardized, proprietary, open, point-to-point, networked or otherwise.

Power supply 118 can include one or more of a battery or batteries (such as, e.g., Li-ion, Li-Polymer, NiMH, NiCd, NiZn, and NiH$_2$, to name a few, whether rechargeable or primary batteries), a power connector (e.g., to connect to vehicle supplied power, etc.), or it can include any other suitable power supply.

Vehicle 100 can include a plurality of airbag units 130 located in different areas around a vehicle 100 cabin. Airbag units 130 are configured to protect the occupants from contacting the interior of vehicle 100. In various embodiments, airbag units 130 may be positioned at any of a variety of locations within the vehicle 100. For example, vehicle 100 may include, front airbags (e.g., front passenger, driver), side curtain airbags, door panel airbags, roof line airbags, and any other desired type of airbag unit 130. Airbag units 130 may be placed in any location of the vehicle where there is a risk of an occupant impacting the interior of the vehicle, and the technology disclosed herein is applicable with any airbag unit 130 regardless of location.

Airbag units 130 include an airbag 132 and an inflator 134. In various embodiments, airbags 132 may include a plurality of tethers configured to enable the trajectory of airbag deployment to be controlled (discussed in greater detail below). Where tethers are used with airbag 132, a plurality of tether cutters 136 are included in the respective airbag unit 130 and configured to cut one or more of the tethers as instructed by the airbag controller circuit 102. Airbag controller circuit 102 can transmit a signal to each tether cutter, wirelessly or wired, based on a cutting sequence determined by the deployment sequencing circuit 112 of the airbag controller circuit 102. In various embodiments implemented with side curtain airbags, one or more cinch tethers may also be included, designed to restrict the flow of air through the curtain airbag or, when relaxed, allow more air to flow through. Each cinch tether may be associated with a tether cutter or a tether retractor. Where a tether cutter is implemented, the cinch tether may be initially configured in a closed position, stopping or minimizing the amount of air which may flow through the cinch tether to other portions of the airbag. Airbag controller circuit 102 may be configured to determine, for the cutting sequence, whether air needs to flow past the area of the cinch tether, including an instruction in the cutting sequence to trigger the tether cutter to cut the cinch tether and let air flow through that area substantially unimpeded. In embodiments where a tether retractor is implemented, the cinch tether may be initially configured in a relaxed position, such that air can flow substantially unimpeded through the area of the cinch tether. Airbag controller circuit 102 may be configured to determine, for the cutting sequence, whether air should be restricted, including an instruction in the cutting sequence to trigger the tether retractor to tense the cinch tether, thereby stopping or minimizing the amount of air flow through the airbag.

Sensor system 120 may include sensors configured to provide data usable by the airbag controller circuit 102 in formulating and executing suitable control commands for the airbag units 130. The sensors comprising sensor system 120 may operate independently of each other in some embodiments. Two or more sensors of sensor system 120 may work in combination.

Figure 2:
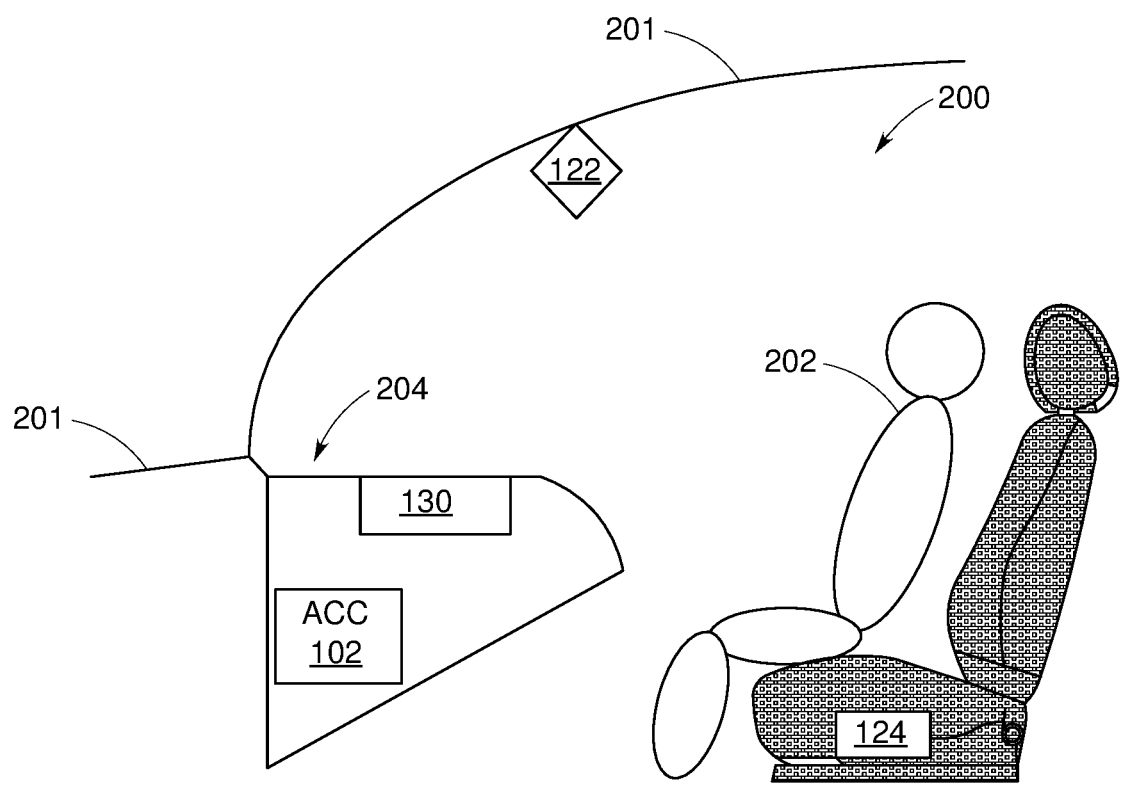
FIG. 2 is a cross-sectional view of a vehicle showing a front passenger compartment in accordance with embodiments of the technology disclosed herein.

FIG. 2 is a cross-sectional view of a vehicle 201 showing a front passenger compartment 200 in accordance with embodiments of the present disclosure. Similar reference characters between different figures are used to identify similar components, and discussion of like reference characters throughout the present disclosure apply equally to each instance. Moreover, although only the front passenger compartment 200 is illustrated, embodiments of the technology disclosed are applicable to any seating areas within the vehicle 201. The illustrated example should not be interpreted as limiting the scope of the technology to the front passenger compartment 200, and a person of ordinary skill in the art would understand how to implement the embodiments in different seating areas (e.g., driver's seat, rear passenger seat, etc.).

Referring to FIG. 2, front passenger compartment 200 includes an image sensor 122 of the sensor system 120. Image sensor 122 is designed and configured to track the head position of one or more occupants of the vehicle by, for example, using eye-tracking technology. In some embodiments, the image sensor 122 may determine the position of the occupant's head through comparing video frames and predictive imaging. A person of ordinary skill in the art would understand that the image sensor 122 may be any sensor component capable of tracking motion, and the examples recited above should not be interpreted as limiting the scope of the technology to only those examples.

In the illustrated example, the image sensor 122 is centrally located within passenger compartment 200 and in front of the occupant 202. In various embodiments, the image sensor 122 may be attached to the rear view mirror of the vehicle, or built into the rear view mirror. In some embodiments, the image sensor 122 may be affixed to the roof line across the front windshield. The image sensor 122 may be positioned on a section of a dashboard 204 and positioned to face the occupant and monitor the occupant's head position. In various embodiments, a single image sensor 122 may be used to monitor the head position of all occupants in the front passage compartment 200, the rear passenger compartment (not shown), or both. In other embodiments, more than one image sensor 122 may be used to monitor the occupant(s) 202. For example, one or more image sensors 122 may be affixed to or built into the front pillar (i.e., the A pillar) on each side of the front passenger compartment 200 of the vehicle and positioned to monitor the head position of one or more occupant(s) 202. Multiple image sensors 122 may be placed along the dashboard 204, each configured to monitor one or more occupant's 202 head positions. In various embodiments, one or more image sensors 122 can be affixed to the ceiling of the vehicle compartment such as, for example, above the front passenger seats, and configured to monitor the head positions of occupants in the rear passenger compartment.

In addition to image sensor 122, the sensor system 120 can include other types of sensors. Non-limiting examples of additional sensors which may be included in sensor system 120 include: weight or pressure sensors (e.g., seat-mounted weight sensors 124, headrest-mounted sensors); body positional sensors 126; seat position sensors; height sensors; and sensors for measuring other characteristics or conditions. For example, sensors capable of detecting vehicle operating conditions may sense that the vehicle is progressing in a certain direction. Certain calculations or assumptions can be made regarding an occupant's positioning based on the trajectory of a vehicle. In some embodiments, one or more sensors may be used to verify the positioning of an occupant's body or body part(s). Vehicle occupant parameters determined using the sensor data may be provided to the airbag controller circuit 102 for use in generating control signals for operation of the airbag units 130. In various embodiments, sensor system 120 may further include pre-collision sensors configured to alert the airbag controller circuit 102 to vehicle external conditions which indicate that a collision is imminent or probable. The pre-collision sensors may include radar-based sensors, laser-based sensors, externally oriented cameras, gyroscopes, or any other suitable sensors.

Figure 3:
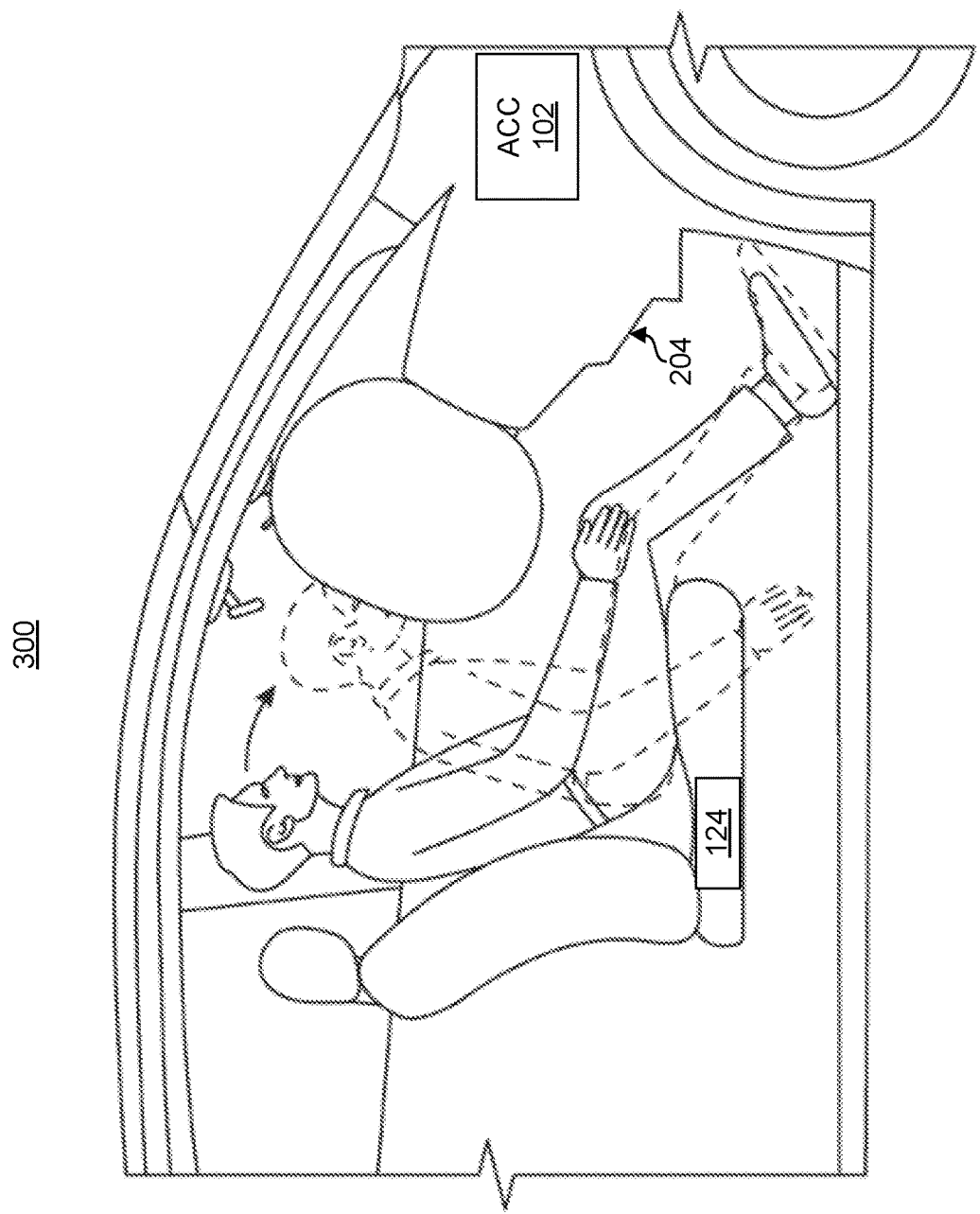
FIG. 3 illustrates an example airbag deployment scenario in accordance with embodiments of the technology disclosed herein.
Figure 4:
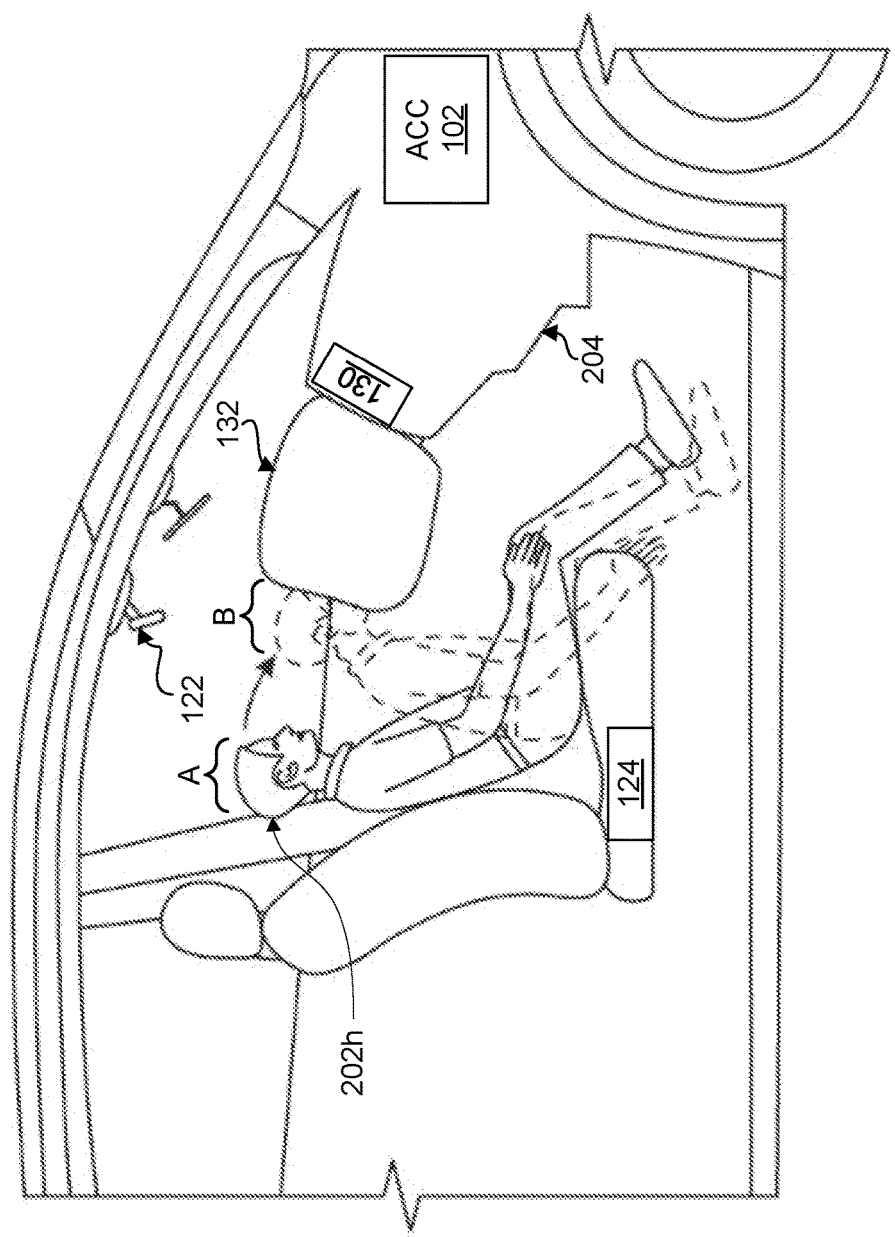
FIG. 4 illustrates another example airbag deployment scenarios in accordance with embodiments of the technology disclosed herein.

As discussed above, the trajectory of deployment of the airbag is static. Embodiments of the technology of the present disclosure enables the trajectory of deployment to change based on the detected position of the occupant's head. FIGS. 3 and 4 illustrate example airbag deployment scenarios 300 and 400, respectively, in accordance with embodiments of the technology disclosed herein. As illustrated, the trajectory of the airbag changes based on the detected position of the occupant's head 202a. Referring to FIG. 3, prior to a collision, the occupant is in position A. The image sensor 122 can monitor the status of the occupant's head 202h during operation of the vehicle. In this way, the airbag controller circuit 102 can remain informed as to the position of the occupant's head 202h. In various embodiments, the image sensor 122 can determine the position of the occupant's head by tracking the occupant's eyes.

When a collision is detected by the vehicle's collision detection systems, the image sensor 122 can track the position of the occupant's head 202h. In various embodiments, the image sensor 122 may include hardware, software, or a combination of both for determining a direction of movement of the occupant's head as the occupant moves from position A to position B. In other embodiments, the image sensor 122 may transmit the eye-tracking data to the airbag controller circuit 102, and the processor 116 of the deployment sequencing circuit 112 may determine the direction of movement of the occupant's head 202h. Based on the determination of the direction in which the occupant's head 202h from position A to position B, the deployment sequencing circuit 112 can determine the sequence in which tethers should be cut in order to direct the airbag 130 to optimal catch the occupant's head 202h.

By cutting tethers in a particular sequence, the airbag controller circuit 102 is capable of changing the trajectory of the airbag 132 during deployment. As illustrated in FIG. 3, the trajectory of the airbag 132 is shifted up, such that the occupant's head 202h is centrally located in the airbag 132 at position B. By changing the trajectory, the airbag 132 is capable of providing a similar level of risk reduction while covering a smaller area, enabling smaller airbags to be used.

FIG. 4 illustrates another example airbag deployment scenario 400 in accordance with embodiments of the technology disclosed herein. In comparison with scenario 300 of FIG. 3, a smaller occupant is present. With a smaller occupant, the potential location of the occupant's head 202h at position B will differ from the location of the occupant's head in FIG. 3. The image sensor 122 and/or the deployment sequencing circuit 112 of the airbag controller circuit 102 determine the direction in which the occupant's head 202h is moving during the collision. Based on the size of the occupant, the sequence of cutting the tethers is determined by the deployment sequencing circuit 112 to change the trajectory of the airbag 132 to deploy in a lower position. As illustrated in FIG. 4, the airbag 132 extends further below the dashboard 204 than in scenario 300 of FIG. 3, and does not extend as high.

The sequence with which tethers are cut impacts how the propellant gas entering the airbag is distributed. Tethers which are not cut restrict the expansion of the airbag 132 in those areas, forcing the propellant gas to rush to an unrestricted portion of the airbag 132. The cutting sequence enables the airbag controller circuit 102 to control how the propellant gas is distributed to change the trajectory of the airbag 132.

Figure 5B:
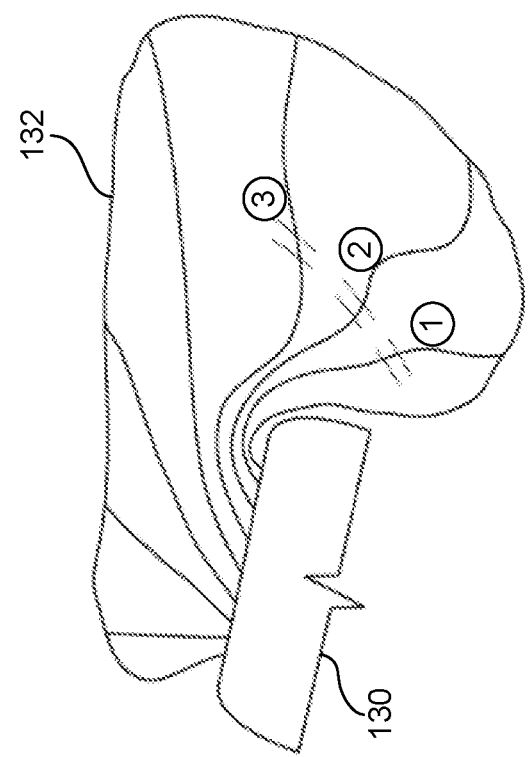
FIG. 5B illustrates an example tether cutting sequence for the example airbag deployment scenario of FIG. 4.
Figure 5A:
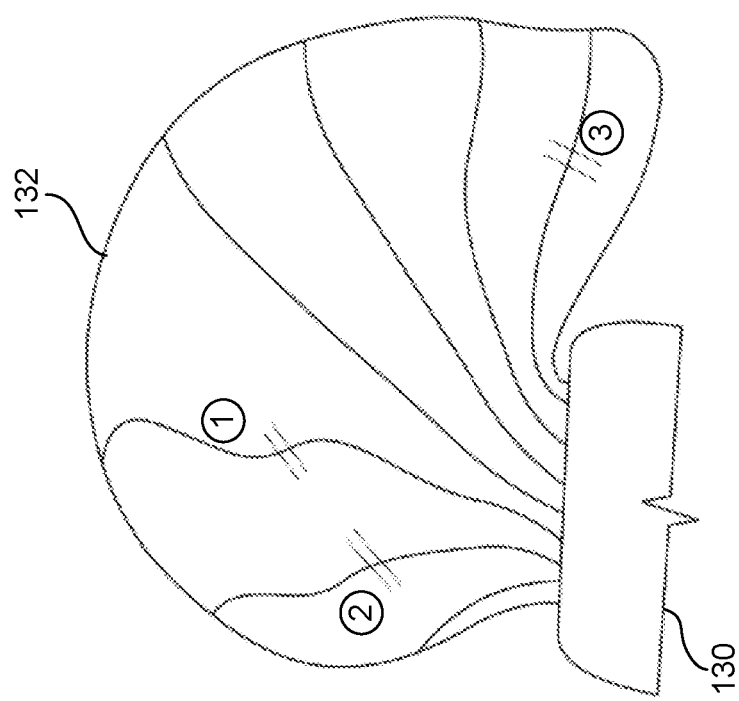
FIG. 5A illustrates an example tether cutting sequence for the example airbag deployment scenario of FIG. 3.

FIGS. 5A and 5B illustrate example tether cutting sequences for scenarios 300 and 400, respectively. As illustrated in FIG. 5A, to change the trajectory of the airbag 132 to optimize catching the occupant's head 202h in scenario 300. As illustrated, the tether 1 would be cut first, allowing the bag to expand upwards away from the airbag unit 130. Tether 2 is then cut, further allowing the airbag to expand upwards. Finally, tether 3 is cut.

FIG. 5B illustrates an example tether cutting sequence to achieve the airbag 132 deployment illustrated in FIG. 4. As illustrated, tether 1 is cut first to allow the airbag 132 to expand in a downward direction compared to the airbag unit 130. Tether 2 is then cut to allow further downward expansion, but also to allow the airbag 132 to expand towards the occupant. Finally, tether 3 is cut to further allow the airbag to expand towards the occupant. The other tethers remain intact, restricting the airbag from expanding vertically.

This illustrated sequences are for explanation purposes only, and should not be interpreted to limit the technology to this specific sequence.

Figure 6:
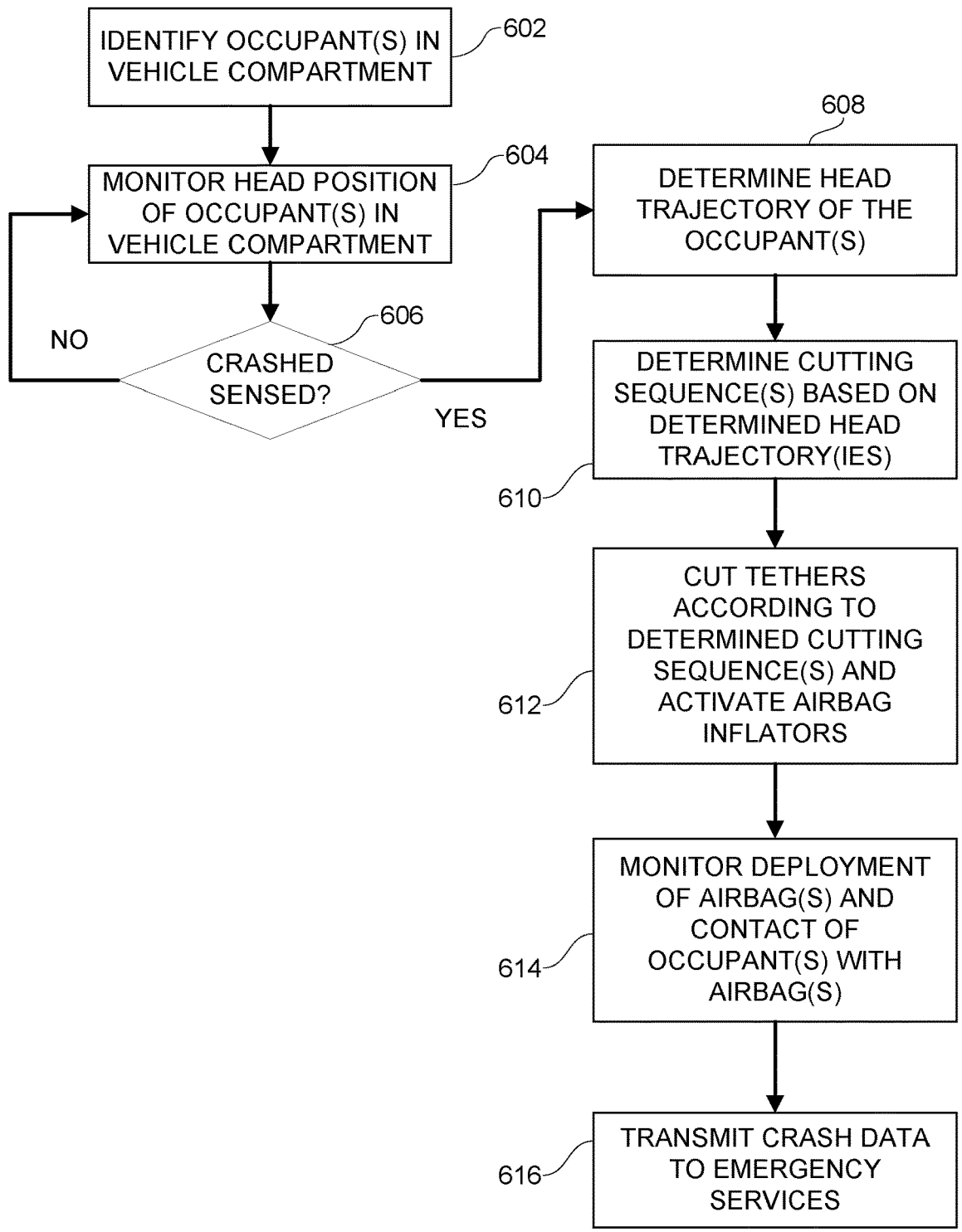
FIG. 6 illustrates an example method in accordance with embodiments of the technology disclosed herein.

FIG. 6 illustrates an example method 600 in accordance with embodiments of the technology discussed herein. In various embodiments, the method 600 can be implemented by the airbag controller circuit 102 in conjunction with the sensor system 120 and the airbag units 130. Various operations may be performed by different components of airbag controller circuit 102, sensor system 120, and/or the airbag units 130. At operation 602, the number of occupants in the vehicle are identified.

In various embodiments, the number of occupants may be determined through occupant data obtained by various sensors of the sensor system 120. For example, in some embodiments seat weight sensors may identify that a person has sat down. In other embodiments, an image sensor 122 may identify each occupant within the vehicle compartment.

At operation 604, the head position of each occupant in the vehicle compartment. By monitoring the head positions of the occupants during operation the direction of motion of the occupant's head can be determined in a more efficient manner. In some embodiments, head positions may not be monitored continuously, but monitoring can be triggered when a crash or collision is detected by one or more collision sensors of the vehicle. In various embodiments, the head positions of occupants may be monitored using eye tracking technology of one or more image sensors. Determining the position of an occupant's head may be determined locally at the image sensor and/or at the airbag controller circuit as discussed with respect to FIGS. 1-4.

At operation 606, the airbag controller circuit identifies whether a crash is sensed by one or more sensors of the vehicle. In various embodiments, the airbag controller circuit receives the data from one or more collision sensors of the vehicle and determine whether a crash or collision is occurring. In other embodiments, a vehicle ECU may determine a crash is occurring and transmit a notification or other alert message to the airbag controller circuit to inform the airbag controller circuit of the crash situation. If the determination is "NO," the method 600 loops back to operation 604 and continues to monitor the head positions of the occupants.

If a crash is sensed (the "YES" branch), the trajectory of each occupant's head is determined at operation 608. As discussed with respect to FIGS. 1-4, the image sensor and/or airbag controller circuit can determine the trajectory an occupant's head is on based on the eye-tracking or other motion monitoring technology used. A separate determination is made for each occupant within the vehicle. In some embodiments, one image sensor may be capable of monitoring more than one occupant at a time. One or more image sensors may be included and configured to monitor a single occupant in a particular seat (e.g., the front passenger).

Based on the determined trajectory or trajectories, a cutting sequence for the tethers is determined at operation 610. The cutting sequence is configured to change the trajectory of the airbag so the airbag is deployed to a position determined to reduce the risk of the occupant's head contacting an edge of the airbag and potentially causing serious injury or death. The deployment sequencing circuit of the airbag controller circuit can identify how the cut the tethers to achieve the necessary trajectory on airbag deployment. A different cutting sequence can be determined for each occupant in the vehicle. In this way, embodiments of the technology of the present disclosure are capable of modifying the deployment of different airbags for each individual. In various embodiments, the cutting sequence may be determined with respect to a frontal airbag, side curtain airbag, or other airbag configured in the vehicle to protect a particular occupant. In some embodiments, the deployment sequencing circuit may be communicatively coupled to a non-transitory machine-readable memory storing a plurality of pre-identified sequences, or "playbooks," and determining the cutting sequence may comprise using the sensor data to select a playbook and optimize the playbook using the detected sensor data. Each playbook may be determined during development of the particular airbag, based on the known initial shape and how the inertia of the airbag when fired allows the bag to proceed on the current path. Each playbook may be designed to cover a position of an occupant's head. In various embodiments, the number of playbooks maintained by airbag controller circuit 102 may vary, depending on the level of granularity implemented. In various embodiments, the number of playbooks maintained may depend on the processing speed of the system (e.g., the maximum number of playbooks airbag controller circuit 102 could search and modify within the necessary deployment speed of the airbag in a crash situation).

Once the cutting sequences are determined, the tethers are cut according to the determined sequences in conjunction with activation of airbag inflators at operation 612. To control the trajectory of the airbag during deployment, the cutting sequence identifies not only which tethers to cut, but also the timing of when to cut the tethers during inflation of the airbag.

A person of ordinary skill in the art would understand that this process would occur rapidly.

At operation 614, the deployment of the airbag and the contact of the airbag with the occupants are monitored. Monitoring the deployment of the airbags, based on the cutting sequences, enables the airbag controller circuit to identify any errors that occurred during deployment. Such errors may be recorded in the memory of the airbag controller circuit. In various embodiments, the airbag controller circuit can upload the information concerning operation of the airbag controller circuit and airbag units to a cloud server or other remote database where the vehicle is configured to connect to a network. The operational information may be utilized to evaluate the performance of particular components used in various vehicles. In other embodiments, machine learning algorithms may be applied to the operational data to determine changes to be made to the machine-readable instructions implemented by the airbag controller circuit. In such embodiments, the wireless communication transceiver of the airbag controller circuit may include one or more hardware circuits and/or software to communicate over a network connection. In other embodiments, the airbag controller circuit may transmit the operational data to the vehicle ECU, which may upload the information to a remote server or database.

In addition to monitoring for operational performance, method 600 can also monitor the occupant's contact with the airbag, to identify a status of the occupant. For example, the airbag controller circuit can identify whether the occupant contacted the airbag as expected and/or if the occupant was injured during the crash. The crash data can be transmitted to the emergency services at 616. The crash data can include the data discussed above collected at operation 614, as well as information indicating which airbags were deployed in the vehicle, the number of occupants in the vehicle, among other information collected.

As discussed above, current airbag systems deploy in a static manner, designed to cover a specific area in front of an occupant. Moreover, the design is based on an occupant being in a known position because the focal point is on the vehicle structure, not the occupant. By focusing instead on the occupant, and specifically the position of the occupant's head, embodiments of the technology disclosed herein provide greater flexibility in deployment. Embodiments of the technology disclosed herein not only can change the trajectory along the vertical access as illustrated in FIGS. 3, 4, 5A, and 5B, but also along the horizontal access. The ability for 360° variation in the trajectory of the airbag allows the airbag controller circuit to account for occupants who are not in the expected position (e.g., not sitting in a front-facing seat directly in front of the airbag system). As autonomous vehicles become more prevalent, seating position within the vehicle cabin can evolve beyond the standard arrangement due to a person not needing to pay attention and control the vehicle.

Figure 7A:
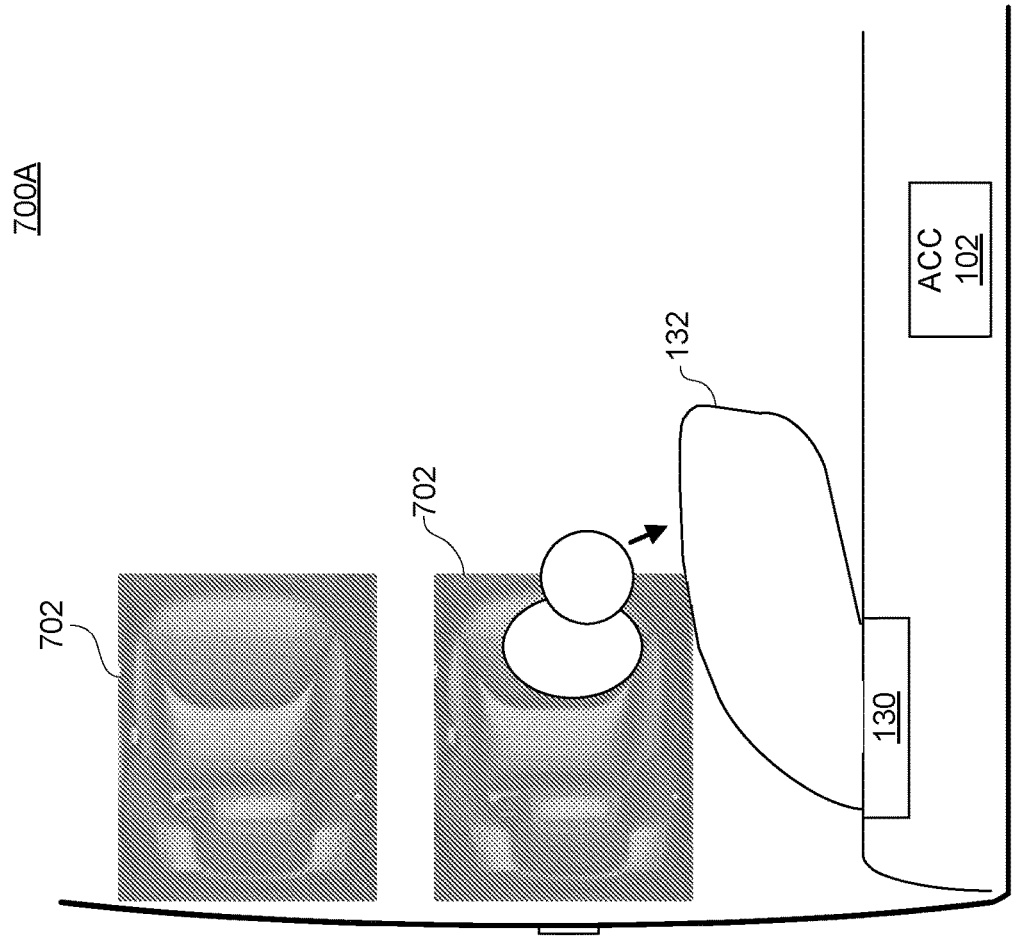
FIG. 7A illustrates an example vehicle interior in accordance with embodiments of the technology disclosed herein.

FIG. 7A illustrates an example vehicle interior 700A in accordance with embodiments of the technology disclosed herein. The example vehicle interior 700A is an example seating configuration that could be used in an autonomous vehicle. As illustrated, the seats 702 are arranged to face into the vehicle interior 700A, unlike the traditional arrangement of seats (i.e., facing forward). During a collision, the occupant's trajectory can be quite different from the standard arrangement. To account for the trajectory of the occupant (illustrated by the arrow), the airbag controller circuit 102 can determine the cutting sequence necessary for the airbag 132 to be deployed in the direction required and achieve the illustrated final shape/position. In such embodiments, the one or more image sensors for tracking the occupant's head can be affixed in the middle of the ceiling. In various embodiments, a fish lens or other optical configuration enabling 360° viewing can be used to limit the number of image sensors necessary to monitor all the occupants in the vehicle interior.

In various embodiments, an occupant's trajectory may be different than expected, as illustrated in example interior 700 B illustrated in FIG. 7B. Although the seats 702 are orientated in a traditional manner, the occupant's trajectory (illustrated by the arrow) is still off-center in a similar trajectory of shown in FIG. 7A. Therefore, in various embodiments the airbag controller circuit 102 can determine the cutting sequence necessary for the airbag 132 to be deployed in the direction required and achieve the illustrated final shape/position, similar to the sequencing discussed with respect to FIG. 7A. Accordingly, embodiments of the technology disclosed herein are applicable in the traditional orientation, but also provides the ability to install unique, non-traditional orientations of seats 702 within an interior of a vehicle.

Figure 8:
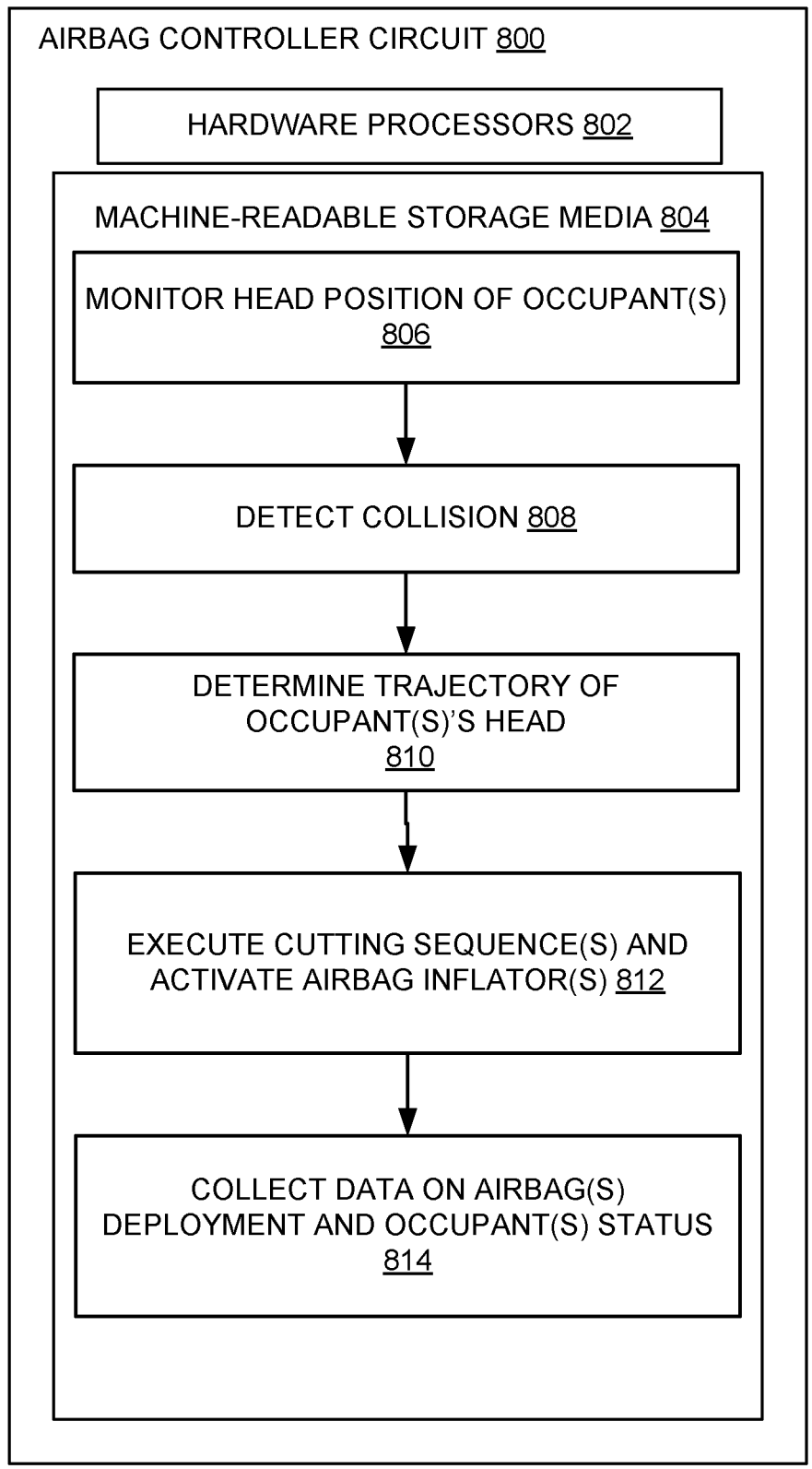
FIG. 8 is an example airbag controller circuit in accordance with embodiments of the technology disclosed herein.

FIG. 8 is an example airbag controller circuit 800 in accordance with embodiments of the present disclosure. In various embodiments, the airbag controller circuit 800 may be similar to the airbag controller circuit 102 discussed with respect to FIGS. 1-4, 5A, 5B, and 6-7. Where operations and functionality of airbag controller circuit 800 are similar to those discussed with respect to FIGS. 1-4, 5A, 5B, and 6-7, the description should be interpreted to apply. Airbag controller circuit 800 includes hardware processors 802. In various embodiments, hardware processors 802 may be similar to the processors discussed above with respect to FIG. 1. In various embodiments, hardware processors 802 may include one or more processors.

Hardware processors 802 are configured to execute instructions stored on a non-transitory machine-readable medium 804. Machine readable medium 804 may be one or more types of non-transitory computer storage mediums. Non-limiting examples include: flash memory, solid state storage devices (SSDs); a storage area network (SAN); removable memory (e.g., memory stick, CD, SD cards, etc.); or internal computer RAM or ROM; among other types of computer storage mediums. The instructions stored on the machine-readable medium 804 may include various sub-instructions for performing the function embodied by the identified functions. For example, the instruction "Monitor Head Position of Occupant(s)" 806 may include various sub-instructions for tracking the position and trajectory of an occupant's head, such as using eye-tracking technology. The monitoring may be performed in a manner similar to the monitoring discussed with respect to FIGS. 1-4, 5A, 5B, and 6-7.

The instruction "Detect Collision" 808 may include various sub-instructions for determining whether a collision is occurring. Detecting a collision can be performed in a manner similar to collision detection systems known in the art. The instruction "Determine Trajectory of Occupant(s)'s Head" 810 may include sub-instructions to calculate the trajectory an occupant's head will take during the collision, based on the monitoring data collected during instruction 806. The trajectory may be determined using conventional approaches.

The instruction "Determine Cutting Sequence Based on Determined Head Trajectory" 812 may include sub-instructions determine the trajectory of deployment based on the determined head trajectory. Moreover, the instructions can include identifying one or more tethers within the airbag which would impact the trajectory, and determine the sequence with which the tethers should be cut to achieve the desired trajectory of the airbag. The cutting sequence may be determined similar to the sequence determination discussed with respect to FIGS. 1-4, 5A, 5B, and 6-7.

The instruction "Execute Cutting Sequence(s) and Activate Airbag Inflator(s)" 816 may include sub-instructions activating one or more tether cutters in accordance with the determined cutting sequence, in conjunction with activating one or more airbag inflators. The instruction "Collect Data on Airbag(s) Deployment and Occupant(s) Status" 814 may include sub-instructions for collecting data from one or more sensors of the vehicle configured to obtain data related to airbag deployment. For example, the instructions may include sub-instructions for determining identifying any errors in deployment that were detected, such as a failed tether cutting, as well as identifying a state of each occupant following contact with the airbags to determine if the airbag deployment was successful. Moreover, the instructions may include sub-instructions for transmitting the collected data to a vehicle ECU, emergency services, and/or a remote storage database.

Although the technology disclosed herein has been described with respect to tethers within the interior of the airbags, other approaches may be taken. For example, tethers may be connected to the exterior of the airbag and configured to change the direction of deployment. In such embodiments, the exterior tethers work to change the trajectory of the airbag in a similar manner as the control lines on a parachute. Similar to the embodiments discussed above, the deployment sequencing circuit of the airbag controller circuit can determine a tether cutting sequence for cutting the exterior tethers to achieve the required trajectory. In some embodiments, a combination of internal and external tethers may be used to provide greater control over the trajectory of the airbag during deployment.

Figure 9:
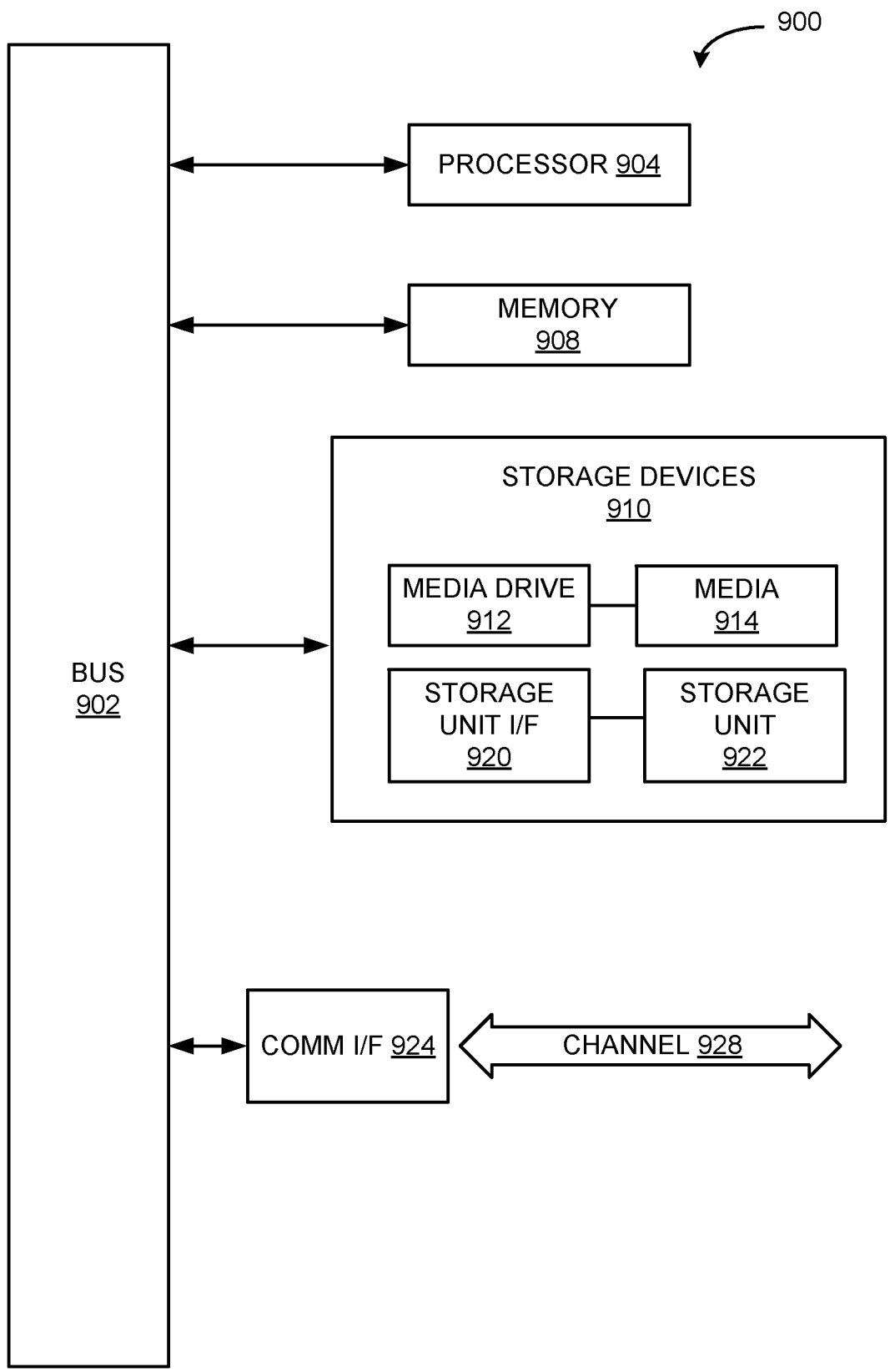
FIG. 9 depicts a block diagram of an example computer system in which various of the embodiments described herein may be implemented.

FIG. 9 depicts a block diagram of an example computer system 900 in which various of the embodiments described herein may be implemented. The computer system 900 includes a bus 902 or other communication mechanism for communicating information, one or more hardware processors 904 coupled with bus 902 for processing information. Hardware processor(s) 904 may be, for example, one or more general purpose microprocessors.

The computer system 900 also includes a main memory 906, such as a random access memory (RAM), cache and/or other dynamic storage devices, coupled to bus 902 for storing information and instructions to be executed by processor 904. Main memory 906 also may be used for storing temporary variables or other intermediate information during execution of instructions to be executed by processor 904. Such instructions, when stored in storage media accessible to processor 904, render computer system 900 into a special-purpose machine that is customized to perform the operations specified in the instructions.

The computer system 900 further includes a read only memory (ROM) 908 or other static storage device coupled to bus 902 for storing static information and instructions for processor 904. A storage device 910, such as a magnetic disk, optical disk, or USB thumb drive (Flash drive), etc., is provided and coupled to bus 902 for storing information and instructions.

The computer system 900 may be coupled via bus 902 to a display 912, such as a liquid crystal display (LCD) (or touch screen), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. In some embodiments, the same direction information and command selections as cursor control may be implemented via receiving touches on a touch screen without a cursor.

The computing system 900 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor(s) 904 executing one or more sequences of one or more instructions contained in main memory 906. Such instructions may be read into main memory 906 from another storage medium, such as storage device 910. Execution of the sequences of instructions contained in main memory 906 causes processor(s) 904 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 910. Volatile media includes dynamic memory, such as main memory 906. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 902. Transmission media can also take the form of acoustic or light waves, such as those generated during radio-wave and infra-red data communications.

The computer system 900 also includes a communication interface 918 coupled to bus 902. Network interface 918 provides a two-way data communication coupling to one or more network links that are connected to one or more local networks. For example, communication interface 918 may be an integrated services digital network (ISDN) card, cable modem, satellite modem, or a modem to provide a data communication connection to a corresponding type of telephone line. As another example, network interface 918 may be a local area network (LAN) card to provide a data communication connection to a compatible LAN (or WAN component to communicated with a WAN). Wireless links may also be implemented. In any such implementation, network interface 918 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 918, which carry the digital data to and from computer system 900, are example forms of transmission media.

The computer system 900 can send messages and receive data, including program code, through the network(s), network link and communication interface 918. In the Internet example, a server might transmit a requested code for an application program through the Internet, the ISP, the local network and the communication interface 918.

The received code may be executed by processor 904 as it is received, and/or stored in storage device 910, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 900.

In common usage, the term "or" can have an inclusive sense or exclusive sense. As used herein, the term "or" should always be construed in the inclusive sense unless the exclusive sense is specifically indicated or logically necessary. The exclusive sense of "or" is specifically indicated when, for example, the term "or" is paired with the term "either," as in "either A or B." As another example, the exclusive sense may also be specifically indicated by appending "exclusive" or "but not both" after the list of items, as in "A or B, exclusive" and "A or B but not both." Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A positional-dependent airbag deployment system, comprising:
   an airbag;
   a plurality of tethers affixed to the airbag;
   a plurality of tether cutters, each tether cutter configured to cut at least one tether of the plurality of tethers;
   an image sensor configured to monitor a position of a head of an occupant of a vehicle;
   an airbag controller circuit communicatively coupled to the plurality of tether cutters and the image sensor, the airbag controller circuit comprising a processor configured to execute instructions stored on a non-transitory machine-readable storage medium that cause the processor to:
   detect a collision;
   determine a trajectory of the head of the occupant of the vehicle based on the monitoring by the image sensor;
   determine a cutting sequence based on the trajectory of the head of the occupant, the cutting sequence comprising an order for cutting one or more tethers of the airbag configured to reduce risk of injury of the occupant; and
   execute the cutting sequence by sending a signal to one or more tether cutters according to the cutting sequence,
   wherein the cutting sequence causes the airbag to deploy at a second trajectory based on the trajectory of the head of the occupant.

2. The positional-dependent airbag deployment system of claim 1, wherein the plurality of tethers are affixed to an interior of the airbag, an exterior of the airbag, or a combination thereof.

3. The positional-dependent airbag deployment system of claim 1, wherein the image sensor is configured to monitor the position of the head of the occupant by tracking an eye position of the occupant.

4. The positional-dependent airbag deployment system of claim 1, wherein detecting the collision comprises receiving an indication of the collision from an electronic control unit of the vehicle.

5. The positional-dependent airbag deployment system of claim 1, wherein the airbag controller circuit is incorporated into an electronic control unit of the vehicle.

6. The positional-dependent airbag deployment system of claim 1, further comprising an inflator communicatively coupled to the airbag controller circuit, and wherein the processor is configured to execute instructions stored on a non-transitory machine-readable storage medium that cause the processor to activate the inflator in response to detecting a collision.

7. The positional-dependent airbag deployment system of claim 6, the processor configured to execute instructions stored on a non-transitory machine-readable storage medium that cause the processor to execute the cutting sequence and activate the inflator simultaneously.

8. The positional-dependent airbag deployment system of claim 1, the airbag comprising one of: a frontal airbag; a side panel airbag; a side curtain airbag.

9. The positional-dependent airbag deployment system of claim 1, further comprising a plurality of airbags, the plurality of airbags comprising one or more of a frontal airbag, a side panel airbag, a side curtain airbag, or a combination thereof.

10. The positional-dependent airbag deployment system of claim 1, further comprising a plurality of image sensors, a first subset of the plurality of image sensors configured to monitor a position of a head of a first occupant of the vehicle, and a second subset of the plurality of image sensors configured to monitor a position of a head of a second occupant of the vehicle.

11. The positional-dependent airbag deployment system of claim 1, further comprising a communication circuit, the communication circuit providing an interface between the airbag controller circuit, the image sensor, and the plurality of tether cutters.

12. A method, comprising:
monitoring, by an image sensor, a position of an occupant of a vehicle;
determining, by an airbag controller circuit, a trajectory of a head of the occupant in response to detecting a collision;
determining, by the airbag controller circuit, a cutting sequence based on the trajectory of the head of the occupant, the cutting sequence comprising an order for cutting one or more tethers affixed to an airbag; and
executing, by one or more tether cutters, the cutting sequence during deployment of the airbag,
wherein the cutting sequence causes the airbag to deploy at a second trajectory based on the trajectory of the head of the occupant.

13. The method of claim 12, wherein the plurality of tethers are affixed to an interior of the airbag, an exterior of the airbag, or a combination thereof.

14. The method of claim 12, wherein the image sensor is configured to monitor the position of the head of the occupant by tracking an eye position of the occupant.

15. The method of claim 12, further comprising activating, by the airbag controller circuit, an inflator in response to detecting the collision.

16. The method of claim 12, wherein a plurality of occupants are in the vehicle, the method further comprising determining, by the airbag controller circuit, a plurality of cutting sequences, each cutting sequence comprising an order for cutting one or more tethers of the airbag configured to reduce risk of injury of each of the plurality of occupants.

17. A non-transitory machine-readable storage medium storing a plurality of instructions that when executed by a processor cause the processor to:
detect a collision;
determine a trajectory of a head of an occupant of a vehicle based on monitoring data collected by an image sensor;
determine a cutting sequence based on the trajectory of the head of the occupant, the cutting sequence comprising an order for cutting one or more tethers of an airbag configured to reduce risk of injury of the occupant; and
execute the cutting sequence by sending a signal to one or more tether cutters according to the cutting sequence,
wherein the cutting sequence causes the airbag to deploy at a second trajectory based on the trajectory of the head of the occupant.

18. The non-transitory machine-readable storage medium of claim 17, further comprising instructions that when executed by the processor cause the processor to activate an inflator associated with the airbag in response to detecting the collision.

19. The non-transitory machine-readable storage medium of claim 18, wherein the instructions to execute the cutting sequence and to activate the inflator occur simultaneously.

20. The non-transitory machine-readable storage medium of claim 17, further comprising instructions that when executed by the processor cause the processor to communicate a plurality of crash data to an emergency service entity, an electronic control unit of the vehicle, a database, or a combination thereof.

\* \* \* \* \*